Patented May 5, 1953

2,637,661

UNITED STATES PATENT OFFICE 2,637,661

FUNGICIDAL COMPOSITION AND PROCESS OF USING SAME

Paul George Benignus, Belleville, Ill., assignor to Monsanto Chemical Company, St. Louis, Mo., a corporation of Delaware No Drawing. Application March 28, 1945, Serial No. 585,384

3 Claims. (Cl. 117—103)

This invention relates to a process for the treatment of fibrous materials and more specifically to an improved process whereby textiles, wood, paper and other fibrous cellulosic materials are protected from attack by fungi and bacteria.

There are many substances which could serve as textile and plastic fungus-proofing agents but which are very insoluble in media which are commonly used in treating textiles and other fibrous cellulosic materials. As a consequence, these fungus-proofing agents have not been used effectively in the treatment of textiles and other materials, and the results have been generally unsatisfactory. In order for even the best fungus-proofing agents to render textiles permanently fungus-proof, the agents must be present within the materials in a sufficient concentration so that, even when some of the agent is lost by washing or weathering processes, there is still sufficient of the agent present to provide protection against fungus and bacteria. Copper pentachlorophenate, cadmium pentachlorophenate and zinc pentachlorophenate are representative of the very insoluble fungicidal agents which heretofore have found very small use as fungicidal agents for textiles in particular because sufficient quantities could not be incorporated in the textiles by any of the known methods.

One of the objects of the present invention is to provide a process whereby textiles, cordage, paper, wood and other cellulosic materials may be impregnated with sufficient amounts of copper, cadmium or zinc pentachlorophenate to protect the materials permanently from attack by fungi and bacteria.

A further object is to provide a process for preparing an improved fungicide composition for treating textiles and other fibrous cellulosic materials.

Another object is to provide an improved process for treating textiles to render them fungus-proof.

Other objects will become apparent from the following description and examples.

The improved fungicide composition of the present invention comprises an aqueous solution containing copper-, cadmium- or zinc-ammonium ions, pentachlorophenate ions, un-ionized water-soluble pentachlorophenates, an alkylated methylol compound of melamine or urea, and a water-miscible organic solvent for copper, zinc and cadmium pentachlorophenates. All of the components of the composition remain in solution during storage and prior to use. The process for rendering textiles and other cellulosic materials fungus-proof by means of the fungicide composition of the present invention comprises impregnating the materials with the solution, removing the impregnated materials from the solution, drying the impregnated materials and heating the impregnated materials to resinify the melamine derivative. In case of cork compositions and articles of wood the fungicidal treatment can be applied by dipping, brushing or spraying methods. During the drying process, water, ammonia and the organic solvent are removed from the material, and the copper, zinc or cadmium ions react with the pentachlorophenate ions to form the respective metal pentachlorophenate within the interstices of the impregnated material. The alkylated methylol compound serves to fix the fungicidal agent thus formed in the impregnated material and to minimize agglomeration of the particles of fungicidal agent. A permanently fine degree of subdivision and a uniformity of distribution of fungicidal agent in the impregnated material are among the outstanding results achieved in the use of the novel compositions of the present invention.

The fungicide composition of the present invention may be formed in any desired manner. For example, one method comprises dissolving a water-soluble copper salt in water, adding sufficient 28% ammonia for the formation of the metallo-ammonium complex ion, adding sufficient of a water-miscible organic solvent for the metal pentachlorophenate to insure the retention in solution of the metal and pentachlorophenate ions for a short period after the ammonia is removed during the drying operation. To this solution is added an aqueous solution of a water-soluble pentachlorophenate and an aqueous solution of an alkylated methylol compound of melamine or urea. The constituents of the solution are thoroughly mixed, and the resulting solution contains substantially no insoluble material.

As an alternative process for preparing the fungicidal composition of the present invention, the metal pentachlorophenate may be prepared directly by reacting a water-soluble metal salt such as copper sulfate, cadmium chloride or zinc sulfate with a water-soluble pentachlorophenate such as sodium pentachlorophenate in an aqueous medium, filtering off the metal pentachlorophenate, and washing the material. The metal pentachlorophenate may then be dissolved in a water-miscible organic solvent in which the metal pentachlorophenate is soluble such as ethyleneglycol mono-butyl ether or diethyleneglycol mono-methyl ether. To this solution 28% ammonium is added to form the complex metalloammonium ion, an alkylated methylol compound of melamine or urea and the solution is thereupon diluted with water to any desired concentration of the metal salt. This solution may then be used to impregnate cellulosic materials in the manner hereinbefore described or in any desired manner.

Any desired method of impregnation of cellulosic materials may be employed. For example, the solution may be applied with a brush or sprayed on the cellulosic material. Also, any method involving immersion or dipping of the cellulosic material in the bath may be employed, including those methods in which increased or decreased pressure or both are used.

Any of the alkylated methylol compounds of melamine or urea having alkyl radicals containing 1 to 4 carbon atoms may be employed in preparing the compositions of the present invention. Illustrative of the melamine compounds are the mono-, di-, tri- and tetra-methyl, ethyl and butyl ethers of mono-, di-, tri-, tetra-, penta- and hexa-methylol melamine and mixtures of various of these compounds, prepared for example, as described in U. S. Patents Nos. 2,197,357 and 2,329,622. Illustrative of the urea compounds are the mono- and di-methyl, ethyl and butyl ethers of mono- and di-methylol urea, prepared for example, as described in U. S. Patents Nos. 1,699,245 and 2,254,001. Some of these ethers may be relatively more stable in the composition than others, or more nearly stable for longer periods of time, depending upon the proportions of the respective components selected in formulating the compositions. A desirable ether for the preparation of the composition of the present invention is represented by a mixed methyl ether of tetra-methylol melamine in which the mono-methyl derivative tends to predominate.

The ether or mixture of ethers of melamine or urea may be incorporated in the composition at any stage of the formulation of the composition. Textiles and other cellulosic materials treated with the composition and dried are then subjected to a heating or baking operation at a temperature above 100° C., for example, at 135–170° C., and below the charring point of the impregnated cellulosic materials for a period of time, usually 5 to 30 minutes, until the alkyl residues of the ether have been split off and the remainder of the derivative has become thoroughly resinified.

The treated cellulosic material may be subjected to a water-proofing treatment, for example, with an aluminum acetate wax composition or a composition containing a N-acylated substituted polyamine, or any other type of water-proofing composition suitable for the purpose.

The textiles thus treated and dried are found to be highly resistant to attack by fungi and bacteria and will withstand repeated washings without losing this resistance and retain their strength even under drastic conditions of soil burial. The fungicide used in the present invention may involve any desired concentration of metal pentachlorophenate in which the cation is copper, cadmium or zinc. A suitable range of concentration of the metal pentachlorophenate has been found to be from 1 to 5%. A fungicidal bath prepared according to the process of the present invention which involved a concentration of the metal pentachlorophenate within this range has been found to be highly satisfactory for the purpose of impregnating cellulosic material which when dried thereafter and heated to resinify the melamine derivative will possess a high degree of resistance to attack by fungi and bacteria. A very desirable concentration of metal pentachlorophenate in the composition for the purpose has been found to be that of 4%.

An alternative process of the present invention for rendering cellulosic materials such as textiles, cordage, paper and wood permanently fungus- and bacteria-proof comprises impregnating the cellulosic materials with an aqueous solution of a water-soluble pentachlorophenate such as sodium or potassium pentachlorophenate in the presence of a wetting agent such as an alkyl-substituted sulfonate, and subsequently treating the cellulosic materials with an aqueous solution of a water-soluble copper, zinc, or cadmium salt in the presence of ammonia, a water-soluble organic solvent for the corresponding metal pentachlorophenate, such as ethyleneglycol mono-butyl ether or any of the other solvents hereinafter described and a methylol melamine alkyl ether and subsequently removing water, ammonia and organic solvent from the cellulosic materials by air drying or application of heat, and heating the impregnated materials to split off the alkyl residue from the methylol melamine ether and polymerize the remaining methylol melamine.

In the aforedescribed alternative process, it is desirable to incorporate in the aqueous solution of water-soluble pentachlorophenate a wetting agent such as a neutral alkyl-substituted aromatic sulfonate of the type known to the trade as Santomerse S. The addition of the wetting agent serves to facilitate the ease with which the solution penetrates the cellulosic material.

The organic solvent in the above procedure may be present in the water-soluble pentachlorophenate solution or in the metal salt solution or in both solutions, but is desirably present in the latter. If the organic solvent is present in the water-soluble pentachlorophenate solution, the methylol melamine alkyl ether and ammonia may be added to that solution or may be present in both solutions. In place of an aqueous solution of the water-soluble pentachlorophenate, a water-soluble organic solvent solution may be employed. The organic solvent is one which is a solvent for the corresponding metal pentachlorophenate of copper, zinc or cadmium. The use of all organic solvent in place of water or of large proportions of organic solvent to water is not desirable in view of the relatively high cost of such solvents and the necessity for providing a low cost treating solution. As little as 10%, or even less, of organic solvent in the aqueous solution has been found satisfactory for the purposes of the present invention. The quantity of organic solvent employed will depend upon the extent to which the corresponding metal pentachlorophenate is soluble in the solvent thus selected. In other words, less of the organic solvent may be employed where the metal pentachlorophenate is soluble to a relatively high degree than in the case where the metal pentachlorophenate is only moderately soluble in the solvent.

Cellulosic materials treated by this 2-solution method have been found to be permanently protected from attack by fungi and bacteria. The metal pentachlorophenate does not form until the ammonia and organic solvent are removed to a substantial extent from the treated cellulosic substance. The whole of the metal pentachlorophenate is formed within the fabric by the time the fabric is dry. The result in the dried cellulosic substance is substantially that of the 1-solution method hereinbefore described. As in the case of the 1-solution treatment, the treated material may be dried by any desired method, for example by heating the material in an oven at a temperature sufficiently high to remove the organic solvent. The presence of a wetting agent in the water-soluble pentachlorophenate solution was found to facilitate the ease with which the cellulosic material was impregnated by the solution.

In place of ethyleneglycol mono-butyl ether other water-miscible solvents for the metal pentachlorophenates may be employed, for example ethyleneglycol mono-methyl ether, ethyleneglycol mono-ethyl ether, diethyleneglycol mono-ethyl ether, isopropyl alcohol, butanol and triethyl phosphate. The selection of the solvent is determined by the facility for removing the solvent in the drying operation and also by the time element between the preparation of the composition and the use of the composition. For example, ethyleneglycol mono-methyl ether will dissolve copper pentachlorophenate to a limited extent, but in the presence of ammonia and water a solid material will in time separate. Moreover, a solvent which has too high a boiling point is not satisfactory since it is difficult to remove such a solvent from the treated cellulosic material during the drying operation. Solvents which are immiscible with water are undesirable. The preferred solvent is ethyleneglycol mono-butyl ether, since it is water-soluble, is an excellent solvent for the metal pentachlorphenates involved in the present invention, and possesses a boiling point which is not too high for effective removal during the drying operation. Moreover, fungicidal compositions of the present invention which contain ethyleneglycol mono-butyl ether appear to be quite stable over substantial periods of time.

The following examples serve to illustrate the process of the present invention. This invention, however, is not limited to these examples.

*Example I*

A fungicidal composition was prepared as follows: 8.8 grams of copper sulfate pentahydrate were dissolved in 100 ml. of water. To this solution was added 40 ml. of 28% ammonia and 40 ml. of ethyleneglycol mono-butyl ether. Water was added to the solution to make a total volume of 300 ml. A solution of 20 grams of sodium pentachlorophenate in 200 ml. of water was prepared and was slowly added to the first solution with agitation. To the resulting solution was added 60 grams of an aqueous 75% solution of mono-methyl tetra-methylol melamine. The resulting solution comprises an illustrative example of the fungicidal composition of the present invention.

A specimen of 8.25 ounce duck fabric was immersed in the fungicidal composition for about 5 minutes. Longer periods of immersion may be practiced, but 5 minutes was found to be satisfactory. The fabric was removed from the bath and was drained free from excess solution. The resulting fabric was dried by placing it in an oven at 150° C. Any desired method of drying may be practiced. The fabric was allowed to remain in the oven until the ethyleneglycol mono-butyl ether, water and ammonia had been removed and the methylol melamine had become resinified. The fabric was then heated at 135° C. for 15 minutes.

In order to test the effectiveness and permanency of the treatment, the treated fabric was leached for 500 hours in tap water at a pH of 9.0. Following the 500 hour leaching the fabric did not support growth of the test microorganisms to which it was subjected, nor did it lose tensile strength when buried in the soil. The test microorganisms employed were the common textile mildew organisms, such as *Aspergillus niger, Chaetomium globosum, Metarrhizium sp.* and *Penicillium sp.*

The fungicidal composition of the present example was also applied satisfactorily using a mangle or padder whereby the fabric was treated at the rate of 60 yards per minute.

In preparing the fungicidal composition of the present invention, certain water soluble resins, wetting agents and water repellent compositions which are compatible with an alkaline medium of the type present in the composition may be incorporated in the composition. Also, if the presence of soluble salts such as sodium sulfate, sodium chloride and the like is undesirable for a particular adaptation of the solution, the alternative procedure described hereinbefore, whereby the copper pentachlorophenate is dissolved in an organic solvent and water and ammonia are added to the solution, may be employed. However, it has been found that the presence of the soluble sulfates and chlorides does not interfere substantially with the effectiveness of the fungicidal composition of the present invention as prepared from water-soluble metal salts and water-soluble pentachlorophenates.

*Example II*

A fungicidal composition was prepared according to the method of Example I, using 9.1 grams of zinc sulfate hexahydrate in place of the copper sulfate. Textile immersed in this composition and subsequently dried were found to be permanently protected against attack by fungi and bacteria.

*Example III*

A fungicidal composition was prepared according to the method of Example I, using 8.1 grams of cadmium chloride having 2½ molecules of water crystallization in place of the copper sulfate of Example I. As an alternative, a fungicidal composition was prepared by first preparing cadmium pentachlorophenate and subsequently dissolving the material in ethyleneglycol mono-butyl ether, and adding 28% ammonia and water. Cotton duck treated with the resulting fungicidal compositions and subsequently dried were found to be permanently protected against attack from fungi and bacteria.

*Example IV*

A cotton-rayon fabric was immersed for 15 minutes in an aqueous solution containing 1.5% of sodium pentachlorophenate and 0.05–0.1% of a wetting agent such as a neutral alkyl-substituted aromatic sulfonate. The fabric was then passed through a wringer to drain off excess solution. The fabric thus treated was immersed for 15 minutes in an aqueous copper sulfate solution containing 1% of normal copper acetate, in the presence of ammonia in excess of that required to form the complex copper ammonium ion with all of the copper present and also in the presence of approximately 10% of ethyleneglycol mono-butyl ether and 10% of a 75% aqueous solution of dibutyl pentamethylol melamine. Thereupon the fabric was removed, drained, and allowed to dry in an oven at approximately 150° C. The characteristic reddish color of copper pentachlorophenate developed in the fabric as the ammonia and organic solvent were removed by the drying process. The treated fabric was found to be protected permanently against attack from fungi and bacteria, and was found to be capable of withstanding repeated leachings with tap water and severe soil burial tests without losing the permanency of the protection.

Prior to the treatment by the methods of the present invention, the cellulosic materials may be dyed. Although mineral dyeing operations tend to reduce the normal receptivity of the cellulosic materials for fungus-proofing agents, even under such adverse conditions, the preservative treatment is effectively applied and is found to be permanent.

*Example V*

The following composition was prepared according to the method of Example I:

| | |
|---|---|
| Ethyleneglycol mono-butyl ether _____ g__ | 8.0 |
| Methylol melamines (75% solution) __ g__ | 13.2 |
| Sodium pentachlorophenate_____ g__ | 2.0 |
| Copper acetate_____ g__ | 0.64 |
| 28% ammonium hydroxide_____ ml__ | 4.0 |
| Water _____ ml__ | 72.16 |
| Total _____ | 100.00 |

This composition was used to impregnate a series of wood block specimens by dipping the specimens in the composition and thereafter drying and baking the specimens. The treated blocks were exposed to fungi and showed no evidence of mold growth on the treated blocks. The methylol melamines are in the form of an aqueous solution of methyl tetra-methylol melamines in which the mono-methyl ether predominates.

*Example VI*

An aqueous solution was prepared containing 10 g. of normal copper acetate, 40 ml. of 28% ammonia, 60 g. of an alkylated methylol melamine consisting predominantly of monomethyl tetra-methylol melamine to the extent of 75% by weight in water, 40 ml. of ethyleneglycol mono-butyl ether and 50 ml. of water. This solution was diluted to 300 ml. with water. To the solution was added 20 g. of sodium pentachlorophenate dissolved in 20 ml. of water. To the resulting solution was added 0.1% of a mixture of sodium salts of substituted aromatic sulfonic acids consisting predominantly of sodium dodecyl benzene sulfonate, based on the weight of the batch.

In applying this composition the composition was heated to 30-60° C. and a cotton duck fabric was immersed in the solution for 5 minutes. The treated fabric was passed through a wringer and baked for 10 minutes at 135° C. The fabric thus treated was coated with an aluminum acetate-wax type of water repellent and the coating was subsequently dried. Portions of the fabric were leached for successively increasing periods of time ranging from 24 hours to 500 hours in tap water at a pH of 9. Analysis for the presence of copper pentachlorophenate in the treated fabric was found as follows:

| | Per cent of copper pentachlorophenate |
|---|---|
| Fabric as treated_____ | 2.75 |
| Leached with water: | |
| 24 hours_____ | 2.57 |
| 144 hours_____ | 2.45 |
| 500 hours_____ | 1.00 |

Portions of the treated fabric leached with water for 500 hours were inoculated with *Aspergillus niger, Penicillium sp., Metarrhizium sp.* and *Chaetomium globosum*. No evidence of mold growth was found on the specimens after incubation of the inoculated specimens. Another portion of the fabric leached 500 hours was buried in a composted greenhouse soil for two weeks. Following this time it was found that the treated fabric had lost substantially none of its tensile strength.

The process of the present invention may be applied to any fibrous cellulosic material such as textiles, paper, wood, cork and cordage. The conditions of treatment, including the concentration of the treating agent, the proportion of organic solvent to metal salt, the time of treatment, the temperature of the immersion bath and the time and temperature of drying the treated fabric or material may be varied within wide limits, and variations are contemplated as being within the scope of the present invention.

The process of the present invention is characterized by the fact that the metal pentachlorophenate is formed within the fabric during the drying operation rather than at the time the fabric is immersed in the bath. The circumstances under which the water-insoluble metal pentachlorophenate is formed within the fabric are thus distinctly different from those resulting from the so-called two-bath method wherein the fabric is first treated with a water-soluble metal salt and subsequently with a water-soluble pentachlorophenate. The one-bath method of the present invention possesses many advantages over a two-bath method. As an illustration, the fungicidal composition of the present invention may be employed as a coating composition in the sense that it can be sprayed or brushed or otherwise applied to the material which is to be treated. The cellulosic material thereupon absorbs the solution. Thereafter when the ammonia, water and organic solvent evaporate from the material, copper, zinc or cadmium pentachlorophenate is formed within the interstices of the material. The fungicidal composition of the present invention is thereby much more readily adapted to the treating of materials under various circumstances than are the two-bath compositions of the prior art.

While the compositions of the present invention have been described and illustrated in the foregoing specification and examples, it is to be observed that the present invention is not to be construed as being limited in respect to any particular substances, proportions, conditions or combinations except as defined in the claims.

I claim:

1. A fungicidal composition comprising an aqueous solution containing metallo-ammonium ions having a metal residue selected from the group consisting of copper, cadmium and zinc, and a water-soluble pentachlorophenate in the presence of a water-miscible organic solvent for the metal pentachlorophenate and an alkylated methylol derivative of a substance selected from the group consisting of melamine and urea.

2. A fungicidal composition comprising an aqueous solution of metallic ions having a metal residue selected from the group consisting of copper, zinc and cadmium, and pentachlorophenate ions, in the presence of ammonia, a water-soluble organic solvent for the metal pentachlorophenate and an alkylated methylol derivative of a substance selected from the group consisting of melamine and urea.

3. A process of rendering cellulosic substances resistant to attack by fungi and bacteria, comprising impregnating said substances with an aqueous solution containing metallo-ammonium ions having a metal residue selected from the group consisting of copper, cadium and zinc, in the presence of a water-miscible organic solvent for the corresponding pentachlorophenate of the metal herein described, an alkylated methylol derivative of a substance selected from the group consisting of melamine and urea, and a water-soluble pentachlorophenate, and thereafter removing water, ammonia and organic solvent from said cellulosic substances and baking said cellulosic substances at a temperature in the range of 135–170° C.

PAUL GEORGE BENIGNUS.

References Cited in the file of this patent

UNITED STATES PATENTS

| Number | Name | Date |
|---|---|---|
| 2,157,727 | Baker | May 9, 1939 |
| 2,180,142 | Fox et al. | Nov. 14, 1939 |
| 2,182,081 | Hatfield | Dec. 5, 1939 |
| 2,197,357 | Widmer et al. | Apr. 16, 1940 |
| 2,209,970 | Hay | Aug. 6, 1940 |
| 2,282,988 | Creely | May 12, 1942 |
| 2,310,004 | Widmer et al. | Feb. 2, 1943 |
| 2,318,121 | Widmer et al. | May 4, 1943 |
| 2,331,268 | Flenner et al. | Oct. 5, 1943 |
| 2,335,101 | Belzer | Nov. 23, 1943 |
| 2,347,635 | Smith | Apr. 25, 1944 |
| 2,371,618 | Hanson | Mar. 20, 1945 |
| 2,400,677 | Allen | May 21, 1946 |
| 2,416,884 | Schreiber | Mar. 4, 1947 |